US011989561B2

(12) United States Patent
Huan

(10) Patent No.: US 11,989,561 B2
(45) Date of Patent: May 21, 2024

(54) METHOD AND APPARATUS FOR SCHEDULING OUT-OF-ORDER EXECUTION QUEUE IN OUT-OF-ORDER PROCESSOR

(71) Applicant: BEIJING VCORE TECHNOLOGY CO.,LTD., Beijing (CN)

(72) Inventor: Dandan Huan, Beijing (CN)

(73) Assignee: BEIJING VCORE TECHNOLOGY CO., LTD., Beijing (CN)

(*) Notice: Subject to any disclaimer, the term of this patent is extended or adjusted under 35 U.S.C. 154(b) by 240 days.

(21) Appl. No.: 17/611,670

(22) PCT Filed: May 21, 2021

(86) PCT No.: PCT/CN2021/095137
§ 371 (c)(1),
(2) Date: Nov. 16, 2021

(87) PCT Pub. No.: WO2022/028048
PCT Pub. Date: Feb. 10, 2022

(65) Prior Publication Data
US 2022/0308883 A1 Sep. 29, 2022

(30) Foreign Application Priority Data
Aug. 6, 2020 (CN) .......................... 202010784534.3

(51) Int. Cl.
G06F 9/38 (2018.01)
(52) U.S. Cl.
CPC .......... G06F 9/3856 (2023.08); G06F 9/3836 (2013.01)
(58) Field of Classification Search
CPC ..... G06F 9/3836; G06F 9/3855; G06F 9/3856
See application file for complete search history.

(56) References Cited

U.S. PATENT DOCUMENTS 5,604,912 A * 2/1997 Iadonato ............... G06F 9/3836
712/E9.071
10,564,976 B2 2/2020 Silberman et al.
(Continued)

FOREIGN PATENT DOCUMENTS

CN 101447911 6/2009
CN 101447943 6/2009
(Continued)

OTHER PUBLICATIONS

Wong et al., "Efficient methods for out-of-order load/store execution for high-performance soft processors," International Conference on Field-Programmable Technology (FPT), 2013, 4 pages.
(Continued)

Primary Examiner — Courtney P Spann
(74) Attorney, Agent, or Firm — Hodgson Russ LLP

(57) ABSTRACT

The disclosure provides a method and an apparatus for scheduling an out-of-order execution queue in an out-of-order processor. The method includes: constructing a sequence maintenance queue with a same number of items as the out-of-order execution queue, and allocating an empty item for instructions and data entering the out-of-order execution queue, in which the sequence maintenance queue comprises at least one identity (id) field; numbering each item of the out-of-order execution queue sequentially, and recording an id number of each item of the out-of-order execution queue in the id field of the sequence maintenance queue; enabling the instructions to enter an item of the out-of-order execution queue corresponding to an id number pointed by a tail of the sequence maintenance queue; and selecting instructions in ready items for execution from the out-of-order execution queue according to id number information indicated by the sequence maintenance queue.

16 Claims, 7 Drawing Sheets

(56) References Cited

U.S. PATENT DOCUMENTS

| | | | |
|---|---|---|---|
| 2005/0286526 A1 | 12/2005 | Sood et al. | |
| 2008/0059765 A1* | 3/2008 | Svendsen | G06F 9/384 |
| | | | 712/34 |
| 2008/0148282 A1 | 6/2008 | Sodani et al. | |
| 2009/0063735 A1* | 3/2009 | Ng | G06F 9/3834 |
| | | | 710/54 |
| 2015/0095618 A1 | 4/2015 | Abdallah | |
| 2015/0363205 A1 | 12/2015 | Guo et al. | |
| 2019/0163488 A1 | 5/2019 | Karve et al. | |
| 2019/0163489 A1 | 5/2019 | Karve et al. | |
| 2020/0142702 A1 | 5/2020 | Fatehi et al. | |

FOREIGN PATENT DOCUMENTS

| | | |
|---|---|---|
| CN | 104583943 | 4/2015 |
| CN | 107220032 | 9/2017 |
| CN | 108351784 | 7/2018 |
| CN | 109901785 | 6/2019 |
| CN | 110806898 | 2/2020 |
| CN | 111966406 | 11/2020 |
| WO | 2016202120 | 12/2016 |

OTHER PUBLICATIONS

Bai et al, "A dynamically reconfigurable mixed in-order/out-of-order issue queue for power-aware microprocessors," IEEE Computer Society Symposium on VLSI, 2003.

Huan et al., "Constraint-based Random Test Model for Microprocessor Interface Unit," Computer Engineering, 2007, vol. 33, No. 15, pp. 227-229.

CNIPA, First Office Action for CN Application No. 202010784534.3, Dec. 18, 2020.

CNIPA, Notice of Receiving the Invention Patent Right for CN Application No. 202010784534.3, Jan. 28, 2021.

WIPO, International Search Report and Written Opinion for PCT/CN2021/095137, Aug. 26, 2021.

Xu, "A Design of Wakeup and Update Logic in Issue Queue for RISC Processor," Thesis, School of Integrated Circuits, Southeast University, China, May 2014.

\* cited by examiner

METHOD AND APPARATUS FOR SCHEDULING OUT-OF-ORDER EXECUTION QUEUE IN OUT-OF-ORDER PROCESSOR

CROSS-REFERENCE TO RELATED APPLICATIONS

This application is the U.S. national phase application of International Application No. PCT/CN2021/095137, filed on May 21, 2021, which claims priority to Chinese Patent Application No. 202010784534.3, filed on Oct. 6, 2020, the entire contents of which are incorporated herein by reference.

TECHNICAL FIELD

The embodiments of the disclosure relate to the field of microprocessor technology, in particular to a method and an apparatus for scheduling an out-of-order execution queue in an out-of-order processor.

BACKGROUND

The out-of-order execution queue in the out-of-order processor is configured to cache a certain number of instructions (where the instruction can be a program instruction or internal operation(s) decoded internally by the processor, and an instruction may be translated into one or more operations) and data. The processor is responsible for allocating empty items for the instructions and data to enter into the queue, and selecting instructions and data that meet certain conditions from the queue for execution. When the instructions in the out-of-order processor enter into the out-of-order execution queue, the instructions do not flow in the processor according to the sequence specified in the program. As long as execution conditions are met, the following instructions can be first executed over the previous instructions, so as to improve the instruction execution speed. The hardware processing of the out-of-order execution queue is more complicated. Generally, its timing is on critical paths of the processor, which directly affects the frequency of the processor and consumes more power and occupies large chip area. The out-of-order execution queue in the out-of-order processor includes issue queues, access queues for all levels of caches, miss-status handling registers (MSHR), and consistency request queues, etc. The out-of-order execution queues need to maintain an execution sequence.

For instructions entering into the queue, it is necessary to allocate empty items that can be entered when there are multiple empty items. When the instructions in the queue are selected for execution, the instructions that enter the queue first are firstly executed if multiple items in the queue are ready (that is, an oldest-first strategy). This is because the older the instruction is, the more instructions are related to it. Therefore, the oldest instruction is first executed, which can effectively improve the degree of parallelism that instructions are executed by the processor. Furthermore, the hardware resources of the processor are occupied by the oldest instruction, including other components such as other out-of-order execution queues, reorder buffers, and store buffers. The earlier these old instructions are executed, the sooner these hardware resources can be released for use of the following instructions. The sequence in which the instructions enter into the queue is required for identifying which instructions are the oldest in the out-of-order execution queue. In a method, the age of each instruction entering into the out-of-order execution queue is recorded in the queue. That is, a counter is used and each item in the queue is sorted according to the counter. The disadvantage of this method is that, additional registers need to be added for recording of the counter, there may be a register overflow, and the delay is also very large due to multi-level comparison and selection of the sorting circuit. In another common method, the sequence of the instructions in the processor is recorded in a reorder buffer (ROB) and the sequence may be used for sorting. That is, a position of each instruction in the ROB is used as age information of the instruction. The problem of this method is that, the ROB is essentially a First Input First Output (FIFO) queue and the age information cannot be expressed directly with its address, which needs to be transformed. The multi-level comparison of circuits is also a problem. In yet another method, the sequence of the out-of-order execution queue is maintained by pointers. The problem is that after each selection of instructions and data for subsequent execution, a large amount of data movements between the registers is required for maintaining the sequence, with high power consumption.

Therefore, there is a need to design low-latency, low-power, and small-area out-of-order execution queues in the out-of-order processor, so as to achieve concise and efficient allocation, selection and execution for the entered instructions.

SUMMARY

According to a first aspect of the disclosure, a method for scheduling an out-of-order execution queue in an out-of-order processor includes: constructing a sequence maintenance queue with a same number of items as the out-of-order execution queue, and allocating an empty item for instructions and data entering the out-of-order execution queue, in which the sequence maintenance queue comprises at least one identity (id) field; numbering each item of the out-of-order execution queue sequentially, and recording an id number of each item of the out-of-order execution queue in the id field of the sequence maintenance queue; enabling the instructions to enter an item of the out-of-order execution queue corresponding to an id number pointed by a tail of the sequence maintenance queue; and selecting instructions in ready items for execution from the out-of-order execution queue according to id number information indicated by the sequence maintenance queue.

According to a second aspect of the disclosure provide an apparatus for scheduling an out-of-order execution queue in an out-of-order processor. The apparatus includes the processor and a memory configured to store computer instructions executable by the processor. The processor is configured to construct a sequence maintenance queue with a same number of items as the out-of-order execution queue, and allocate empty items for instructions and data entering the out-of-order execution queue, in which the sequence maintenance queue comprises at least one identity (id) field; number each item of the out-of-order execution queue sequentially, and record an id number of each item of the out-of-order execution queue in the id field of the sequence maintenance queue; enable the instructions to enter an item of the out-of-order execution queue corresponding to an id number pointed by a tail of the sequence maintenance queue; and select instructions in ready items for execution from the out-of-order execution queue according to id number information indicated by the sequence maintenance queue.

According to a third aspect of the disclosure, a non-transitory computer-readable storage medium has a computer program stored thereon. When the computer program is executed by a processor, a method for scheduling an out-of-order execution queue in an out-of-order processor is implemented. The method includes: constructing a sequence maintenance queue with a same number of items as the out-of-order execution queue, and allocating an empty item for instructions and data entering the out-of-order execution queue, in which the sequence maintenance queue comprises at least one identity (id) field; numbering each item of the out-of-order execution queue sequentially, and recording an id number of each item of the out-of-order execution queue in the id field of the sequence maintenance queue; enabling the instructions to enter an item of the out-of-order execution queue corresponding to an id number pointed by a tail of the sequence maintenance queue; and selecting instructions in ready items for execution from the out-of-order execution queue according to id number information indicated by the sequence maintenance queue.

Additional aspects and advantages of embodiments of the disclosure will be given in part in the following descriptions, become apparent in part from the following descriptions, or be learned from the practice of the embodiments of the disclosure.

BRIEF DESCRIPTION OF THE DRAWINGS

The above and/or additional aspects and advantages of embodiments of the disclosure will become apparent and more readily appreciated from the following descriptions made with reference to the drawings, in which.

DETAILED DESCRIPTION

Figure 1:
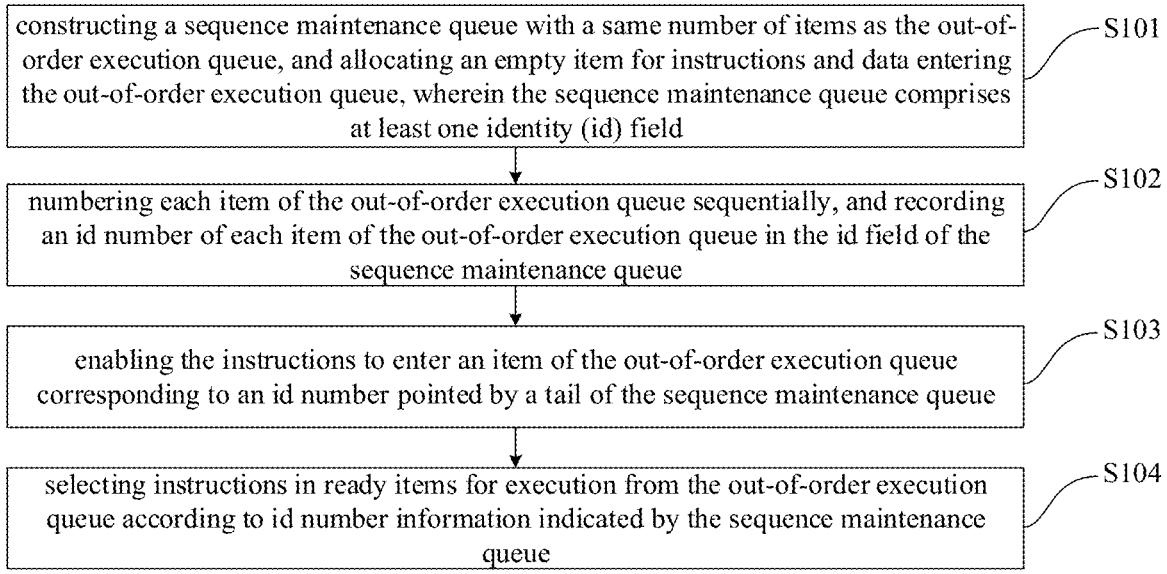
FIG. 1 is a flowchart of a method for scheduling an out-of-order execution queue in an out-of-order processor according to an embodiment of the disclosure.

Embodiments of the disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the disclosure, and are not construed to limit embodiments of the disclosure.

The following describes a method and an apparatus for scheduling an out-of-order execution queue in an out-of-order processor according to the embodiments of the disclosure with reference to the accompanying drawings.

In detail, FIG. 1 is a flowchart of a method for scheduling an out-of-order execution queue in an out-of-order processor according to an embodiment of the disclosure.

As illustrated in FIG. 1, the method for scheduling the out-of-order execution queue in the out-of-order processor includes the following steps.

At S101, a sequence maintenance queue with a same number of items as the out-of-order execution queue is constructed, and an empty item is allocated for instructions and data entering the out-of-order execution queue, in which the sequence maintenance queue includes at least one identity id field.

The out-of-order execution queue includes one or more of a valid field, a ready (rdy) field and a data field, and the sequence maintenance queue includes the id field.

In detail, the out-of-order execution queue includes information fields used by the instructions, such as a valid field, an rdy field, and a data field. The valid field for each item records whether the item is valid (for example, defining the valid field being 1 means the item is valid, and defining the valid field being 0 means the item is invalid). The rdy field for each item records whether the instructions and data for the item are ready (for example, defining the rdy field being 1 means that they are ready, i.e., reaching an executable state, and defining the rdy field being 0 means they are not ready). The data field for each item records information such as commands and data used for the instructions of the item.

At S102, each item of the out-of-order execution queue is numbered sequentially, and an id number for each item of the out-of-order execution queue is recorded in the id field of the sequence maintenance queue.

It may be understood that, the embodiments of the disclosure may use multiple ways to number each item in the out-of-order execution queue. For example, n items in the out-of-order execution queue may be sequentially numbered from 0 to n−1, the n items of the out-of-order execution queue may be also sequentially numbered from 1 to n, which is not specifically limited here. Taking the numbers from 0 to n−1 as an example, the id field of the sequence maintenance queue records the id number of each item in the out-of-order execution queue, which is used to index each item in the out-of-order execution queue. That is, the id numbers from 0 to n−1 correspond to 0 to n−1 items in the out-of-order execution queue.

In an embodiment of the disclosure, a first allocated item in the out-of-order execution queue next time is the item of the out-of-order execution queue corresponding to the id number pointed by the tail of the sequence maintenance queue.

It may be understood that, the content of the id number item in the sequence maintenance queue pointed by the tail of the sequence maintenance queue is the first allocated item in the out-of-order execution queue, that is, the first empty item that may be allocated for the entered instructions in the out-of-order execution queue.

At S103, the instructions are enabled to enter an item of the out-of-order execution queue corresponding to an id number pointed by a tail of the sequence maintenance queue.

It may be understood that, the instructions are directly enabled without any search to enter into the item in the out-of-order execution queue corresponding to the id number pointed by the tail of the sequence maintenance queue, which is simple and efficient. The instruction selection for execution does not require multi-level comparison, without a large amount of data movements and with low latency, saving power consumption and area.

At S104, instructions in ready items are selected from the out-of-order execution queue according to id number information indicated by the sequence maintenance queue.

It may be understood that in the embodiment of the disclosure, the instructions that have been prepared for execution may be found from the out-of-order execution queue according to the id number information indicated by the sequence maintenance queue. In addition, when there are multiple instructions in the out-of-order execution queue that have been already prepared for execution, the embodiments of the disclosure may find the oldest instruction for execution from the out-of-order execution queue according to the id number information given by the sequence maintenance queue.

Furthermore, situations are respectively processed in the embodiments of the disclosure, such as, a situation where the processor performs initialization, a situation where the instructions are only entered into the out-of-order execution queue, a situation where the instructions are only executed in the out-of-order execution queue, a situation where the instructions are entered into the out-of-order execution queue and executed at the same time, a situation where cancellation occurs in the processor due to branch misprediction, speculative memory accesses fail or exceptions, etc. The specific methods are as follows.

In an embodiment of the disclosure, when the processor performs initialization, the method further includes: numbering the id field of the sequence maintenance queue sequentially from the top to the bottom, and setting the tail to 0, the valid field of each item in the out-of-order execution queue to 0, in which the valid field being 0 indicates that the recorded item is invalid.

It may be understood that, during the initialization, the embodiments of the disclosure can use multiple ways to number the id fields. For example, the id fields of the sequence maintenance queue can be numbered from 0 to n−1 from the top to the bottom. For example, the items of the id field can also be numbered from 1 to n from the top to the bottom, and n is a positive integer, which is not specifically limited here.

Figure 2:
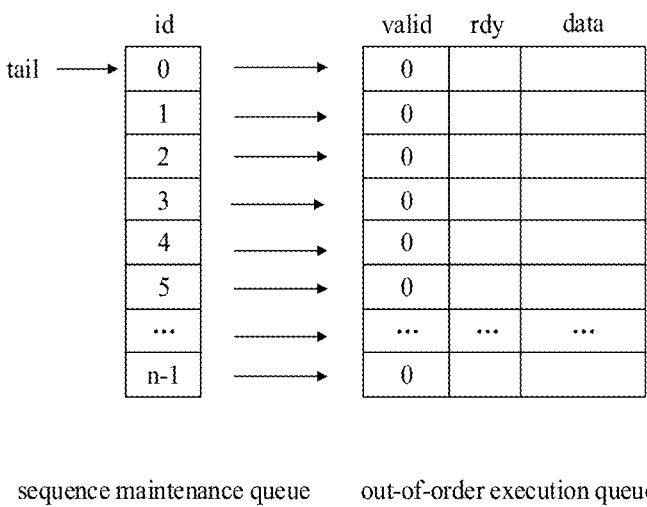
FIG. 2 is a schematic diagram of initializing a sequence maintenance queue and an out-of-order execution queue according to an embodiment of the disclosure.

The following embodiment will take as an example that the items of the id field from the top to the bottom are sequentially numbered from 0 to n−1. During the initialization, the id fields of the sequence maintenance queue are sequentially set from 0 to n−1 and from the top to the bottom, and tail is set to 0, the valid field of each item in the out-of-order execution queue is set to 0, as shown in FIG. 2.

In an embodiment of the disclosure, when the instructions are only entered into the out-of-order execution queue of the processor, the method further includes: enabling the instructions to enter the item of the out-of-order execution queue corresponding to the id number pointed by the tail item of the sequence maintenance queue, and moving the tail of the sequence maintenance queue down by one item, where the tail in the next cycle=the tail in the current cycle +1.

It may be understood that, when the instructions are only entered, the instructions are enabled to enter the item of the out-of-order execution queue corresponding to the id number pointed by the tail of the sequence maintenance queue, where the tail in the next cycle=the tail in the current cycle +1.

Figure 3:
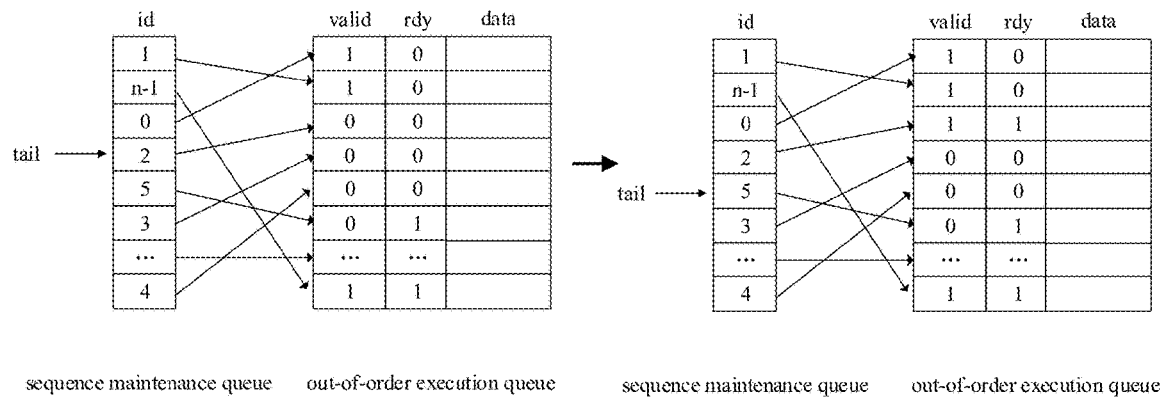
FIG. 3 is a schematic diagram illustrating a process where the instructions enter the item in the out-of-order execution queue corresponding to the item with the id number 2 to which the tail of the sequence maintenance queue points according to an embodiment of the disclosure.

For example, FIG. 3 illustrates a process where the instructions are enabled to enter the item in the out-of-order execution queue corresponding to the item with id number 2 pointed by the tail of the sequence maintenance queue. The item with id number 2 is set with a valid field being 1 and an rdy field being 1 which indicates the operation for the entered instruction is ready. The data information for the instructions are written into the data field of this item. The tail of the sequence maintenance queue in the next cycle moves to the next item and points to the item with id number 5.

Each time the entry for an instruction is received and no instruction is selected for execution in the same cycle, the tail of the sequence maintenance queue moves down by one item. When the out-of-order execution queue is full, the tail of the sequence maintenance queue=n.

In an embodiment of the disclosure, when the instructions are only executed in the out-of-order execution queue of the processor, the method also includes: in an order from the top to the bottom, up to the tail item in the sequence maintenance queue, searching a first item whose valid field is 1 and rdy field is 1 for execution from the items in the out-of-order execution queue, setting the executed first item to be an empty item, moving the contents in the tail item and items before the tail item up by one item and saving an id number corresponding to the empty item in the id field of the tail item of the sequence maintenance queue, where the tail in the next cycle=the tail in the current cycle −1, the valid field being 1 indicates that the recorded item is valid, and the rdy field being 1 indicates that the instructions and data of the recorded item are ready.

It may be understood that, when the instructions are only executed, the sequence maintenance queue finds out the first item in the out-of-order execution queue that corresponds to the id number and satisfies valid==1 and rdy==1 for execution, from the top to the bottom, up to the tail, the contents in the tail of the sequence maintenance queue and its previous items (together with the tail) are moved up by one item, the id number corresponding to the item in the out-of-order execution queue selected for execution and vacated is saved in the id field of the tail item of the sequence maintenance queue, where the tail in the next cycle=the tail in the current cycle −1.

Figure 4:
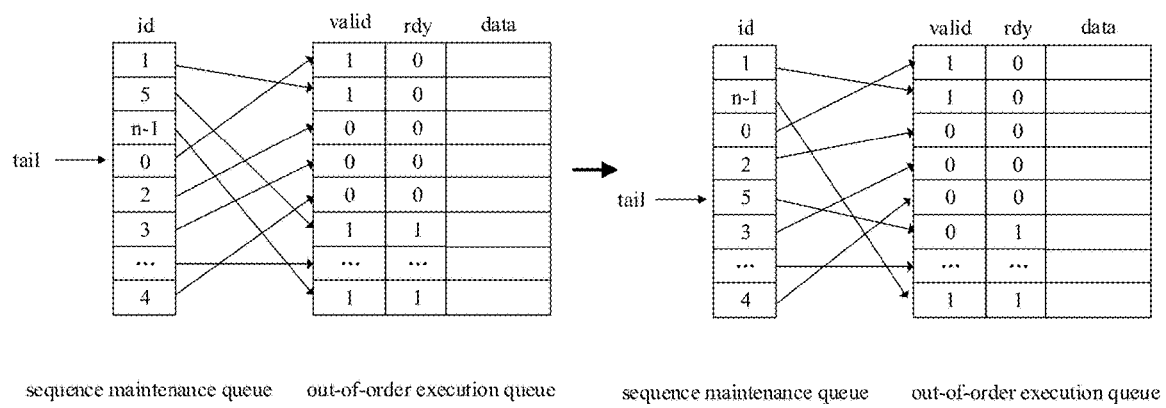
FIG. 4 is a schematic diagram illustrating a process where a first executable item is searched in an out-of-order execution queue for execution according to an embodiment of the disclosure.

For example, FIG. 4 illustrates a process where a first executable item (i.e., the item with the id number 5) is searched in the out-of-order execution queue for execution. After the execution, the valid of the item 5 in the out-of-order execution queue is set to 0, and the id numbers n−1, 0, and 2 in the items of the sequence maintenance queue are all moved up by one item, and the id number 5 corresponding to the item in the out-of-order execution queue that is selected for execution is saved to the item pointed by the tail of the sequence maintenance queue. In the next cycle, the tail is moved up by one item, that is, the tail points to the item with the id number 2.

In particular, when the tail of the sequence maintenance queue==n, (that is, when the out-of-order execution queue is full), after the ready instructions are executed, the contents in the items before the tail are moved up by one item, and the id number in the empty item after execution do not enter into the tail item, but the (tail−1) item, and the tail in the next cycle=n−1.

Figure 5:
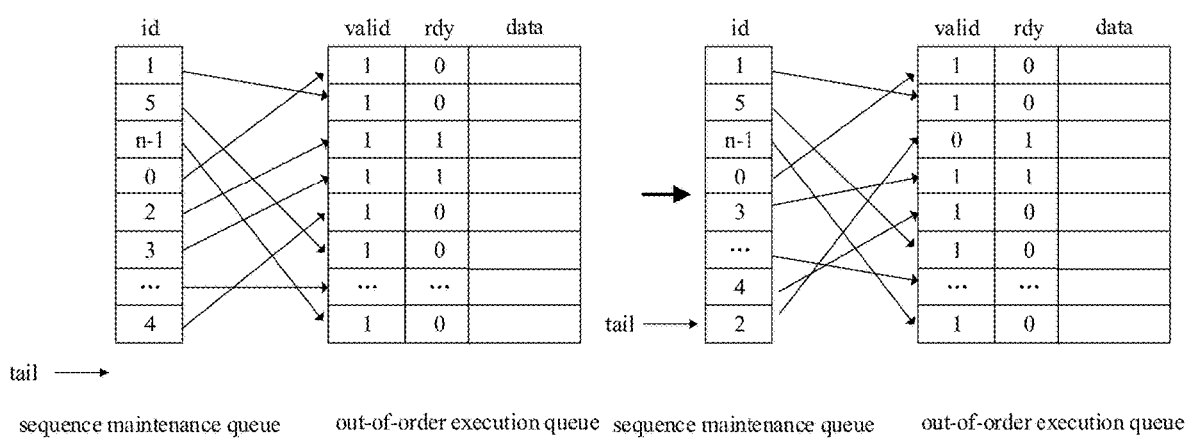
FIG. 5 is a schematic diagram illustrating a process for execution when an out-of-order execution queue is full according to an embodiment of the disclosure.

In FIG. 5, when the out-of-order execution queue is full (that is, tail==n), the item with the id number 2 in the sequence maintenance queue is selected from the top to the bottom, that is, the instruction for the $2^{nd}$ item in the out-of-order execution queue is issued. The id numbers 3, 6, . . . , 4 in the items of the sequence maintenance queue are moved up, the id number 2 of the execution item is written into the (tail−1) item of the sequence maintenance queue, which is the (n−1) item, where the tail in the next cycle=n−1.

In an embodiment of the disclosure, when the instructions in the out-of-order execution queue of the processor are entered and executed at the same time, the method further includes: enabling a new instruction to enter the item in the out-of-sequence execution queue corresponding to the id number pointed by the tail of the sequence maintenance queue, moving the id number in each item of the sequence maintenance queue up by one item, and storing the id number of the issue item into the tail item, wherein the value of the tail in the next cycle remains unchanged.

It may be understood that, when the instructions are executed and entered at the same time in one cycle, the new instruction enters the item of the out-of-sequence execution queue corresponding to the id number pointed by the tail item of the sequence maintenance queue, the id numbers in the tail item and items before the tail item (as well as the tail) are all moved up by one item, the id corresponding to the issue item is stored in the tail item, and the value of tail in the next cycle remains unchanged.

Figure 6:
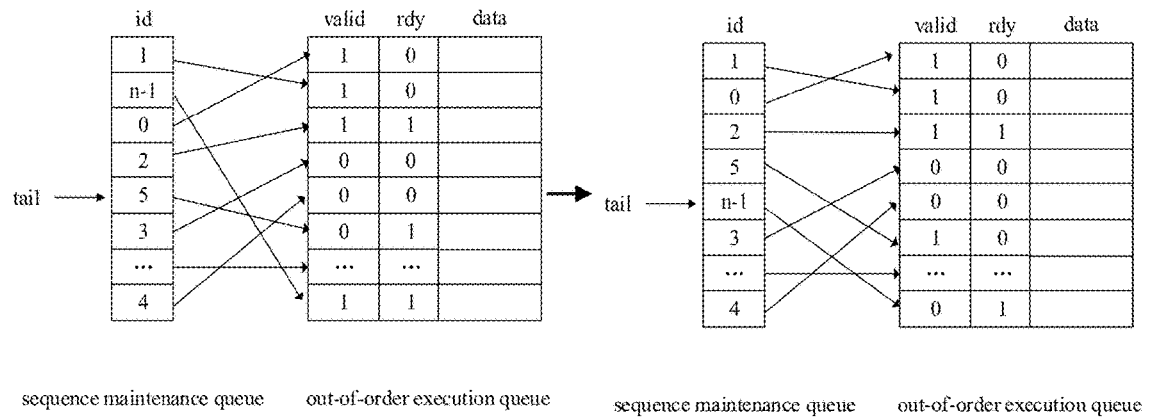
FIG. 6 is a schematic diagram illustrating the instructions are simultaneously executed and entered according to an embodiment of the disclosure.

For example, FIG. 6 illustrates a process where the instruction enters the $5^{th}$ item in the out-of-order execution queue corresponding to the tail, and the instruction for the $(n-1)^{th}$ item in the out-of-order execution queue is selected from the top to the tail is issued. For the $5^{th}$ item in the issue queue, its valid is set to 1 and its rdy for determining whether the operation of the dispatched instruction is ready or not is set to 0, indicating the operation is not ready. The instruction and data information are written into the data field. The id numbers 0, 2, and 5 in the items of the sequence maintenance queue are moved up by one item at the same time, and the id number (n−1) for the issue item is stored to the item pointed by the tail.

In an embodiment of the disclosure, when the processor is in a cancellation situation, the method further includes: setting the valid of a cancelled item in the out-of-order execution queue to 0, in which the cancelled item whose valid is set to 0 is an empty item, and no new instruction enters the cancelled item, and a value of the tail of the sequence execution queue remains unchanged.

The cancellation situations include a variety of situations, for example, branch mis-prediction, speculative memory accesses fail or exceptions, etc., which is not limited here.

It may be understood that when the processor enables some items in the out-of-order execution queue to be cancelled due to branch mis-prediction, speculative memory accesses fail or exceptions, the valid of each cancelled item in the out-of-order execution queue is set to 0, no new instructions may be entered for this cancellation cycle, and the tail of the sequence maintenance queue remains unchanged.

When there are empty items in the out-of-order execution queue corresponding to the id numbers before the tail item of the sequence maintenance queue due to the cancellation. That is, the out-of-order execution queue has items with valid==0, the following processes is performed for each case.

(1) In an embodiment of the disclosure, if there is no instruction to be executed or entered in the current cycle, the following is performed according to a first preset situation, where only one empty item is processed in one cycle, and the first empty item is searched sequentially from the top to the tail item in the sequence maintenance queue, the contents in the tail item and items before the tail item are moved up by one item, the id number corresponding to the first empty item is stored in the tail item, where the tail in the next cycle=the tail in the current cycle −1.

The first preset situation may be a situation that the instruction is only executed or otherwise, which are not specifically limited here. Taking the first preset situation where the instruction is only executed as an example, it may be understood that if there is no instruction to be executed or entered in the current cycle, the empty items are processed in the same way as the item for which the instruction is only executed and only one empty item is processed in one cycle. That is, the first empty item is selected from the top to the tail item, the contents in the tail item and its previous items (together with the tail) are moved up by one item, the id corresponding to the empty item is stored in the tail item, where the tail in the next cycle=the tail in the current cycle −1.

Figure 7:
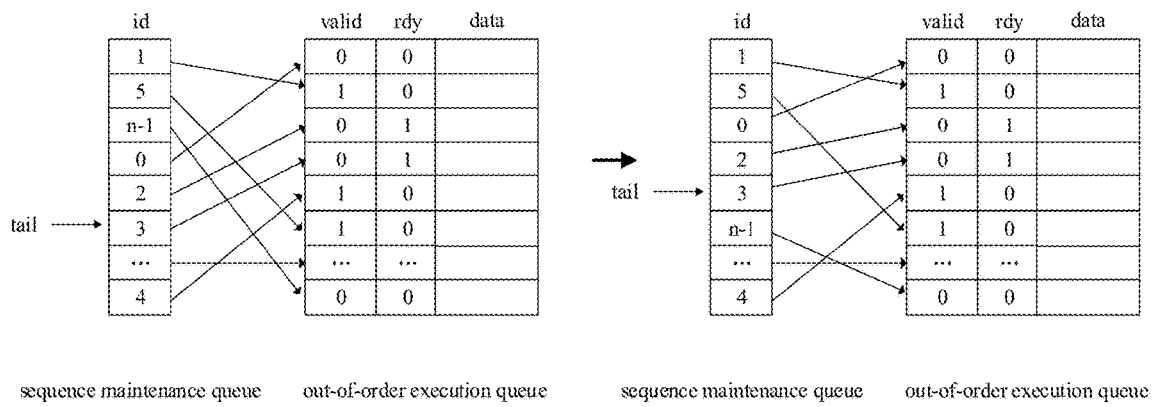
FIG. 7 is a schematic diagram illustrating there are empty items due to cancellation and no instruction enters the queue according to an embodiment of the disclosure.

In FIG. 7, the $(n-1)^{th}$, 0, and 2 items of the out-of-order execution queue are canceled due to branch cancellation, the valid of the corresponding item in the out-of-order execution queue is 0, and no instruction enters in the current cycle. The out-of-order execution queue is searched through the sequence maintenance queue from the top to the tail according to the id, so as to determine the first empty item, i.e., the $(n-1)^{th}$ item. Then, the id numbers 0, 2, and 3 are moved up by one item respectively, and the id number n−1 for the empty item is stored in the item pointed by the tail. The tail is moved up by one item in the next cycle and points to the item with the id number 3.

(2) In an embodiment of the disclosure, if there is no instruction to be executed in the current cycle while there is an instruction to be entered, the following is performed according to a second preset situation where one empty item is processed in one cycle, the new instruction enters the item in the out-of-order execution queue corresponding to the id number for the tail item, and the first empty item is searched from the top to the tail item, the id numbers in the tail item and the items before the tail item are moved up by one item, the id number for the first empty item is stored in the tail item, and a value of the tail in the next cycle remains unchanged.

The second preset situation may be a situation in which instructions are entered and are executed at the same time or otherwise, which is not specifically limited here. Taking the second preset situation where the instructions are entered and are executed at the same time as an example, it can be understood that if there is no instruction to be executed in the current cycle, and there is instruction to be entered in the current cycle, then the empty item is processed as an execution item in the same way that there are instruction execution items and instruction entering items at the same time in the same cycle. Only one empty item is processed in one cycle. The new instruction enters the item in the out-of-order execution queue corresponding to the id pointed by the tail. The first empty item is searched from the top to the tail item, and the id numbers in the tail item and its previous items (together with the tail) are moved up by one item, and the id for the empty item is stored in the tail item, and a value of tail remains unchanged in the next cycle.

Figure 8:
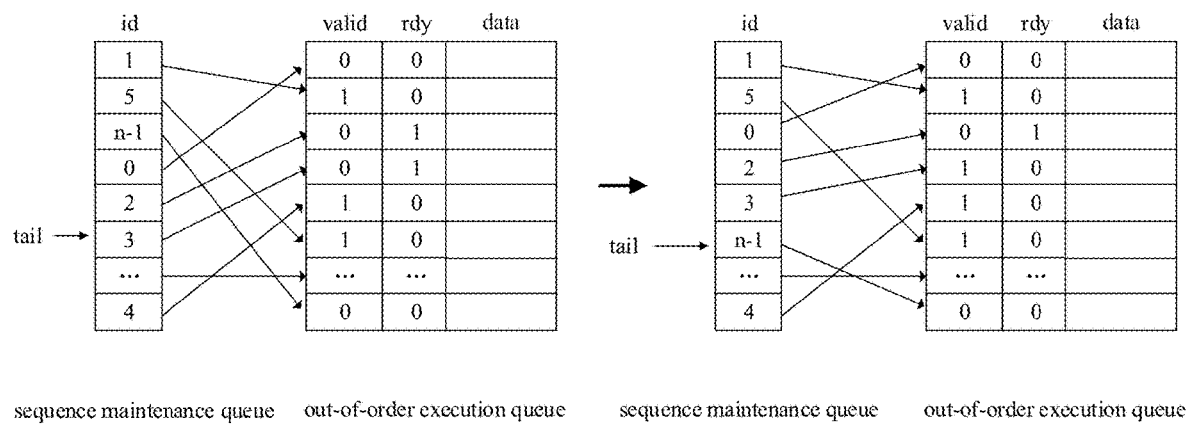
FIG. 8 is a schematic diagram illustrating there are empty items due to cancellation and instructions enter the queue according to an embodiment of the disclosure.

In FIG. 8, the $(n-1)^{th}$, 0, and 2 items of the out-of-order execution queue are cancelled due to branch cancellation, the valid of the corresponding item in the out-of-order execution queue is 0, and an instruction enters in the current cycle. The instruction enters the $3^{rd}$ item corresponding to the content pointed to by the tail. For the $3^{rd}$ item in the out-of-order execution queue, its valid is set to 1, and its rdy for determining whether the dispatched instruction is ready or not is set to 0, indicating the operating condition of this instruction is not ready. From the top to the tail item, the first empty items is searched, i.e., the $(n-1)^{th}$ item. The id numbers 0, 2, and 3 in the items of the sequence maintenance queue are all moved up by one item. The id number (n−1) for the empty item is stored in the item pointed by the tail, and the tail remains unchanged in the next cycle, pointing to the item with the id number (n−1).

(3) In an embodiment of the disclosure, if the queue is full, the following is performed according to a third preset situation, where an empty item may be processed in the current cycle, and the contents in the items of the sequence maintenance queue may be moved up by one item. The id number corresponding to the empty item enters the (tail−1) item, where the tail in the next cycle=the last item of the sequence maintenance queue.

The third preset situation may be a situation where instructions are only executed. Taking the third preset situation where instructions are only executed as an example, it can be understood that if tail==n, the processing on a situation where an empty item appears in the out-of-order execution queue due to cancellation is the same as the processing on a situation where there are only execution items in the current cycle, in which only one empty item is processed in one cycle. The content in each item before the tail is moved up by one item, the id number corresponding to the empty item does not enter the tail item, but enters the (tail−1) item, where the tail in the next cycle=n−1.

Figure 9:
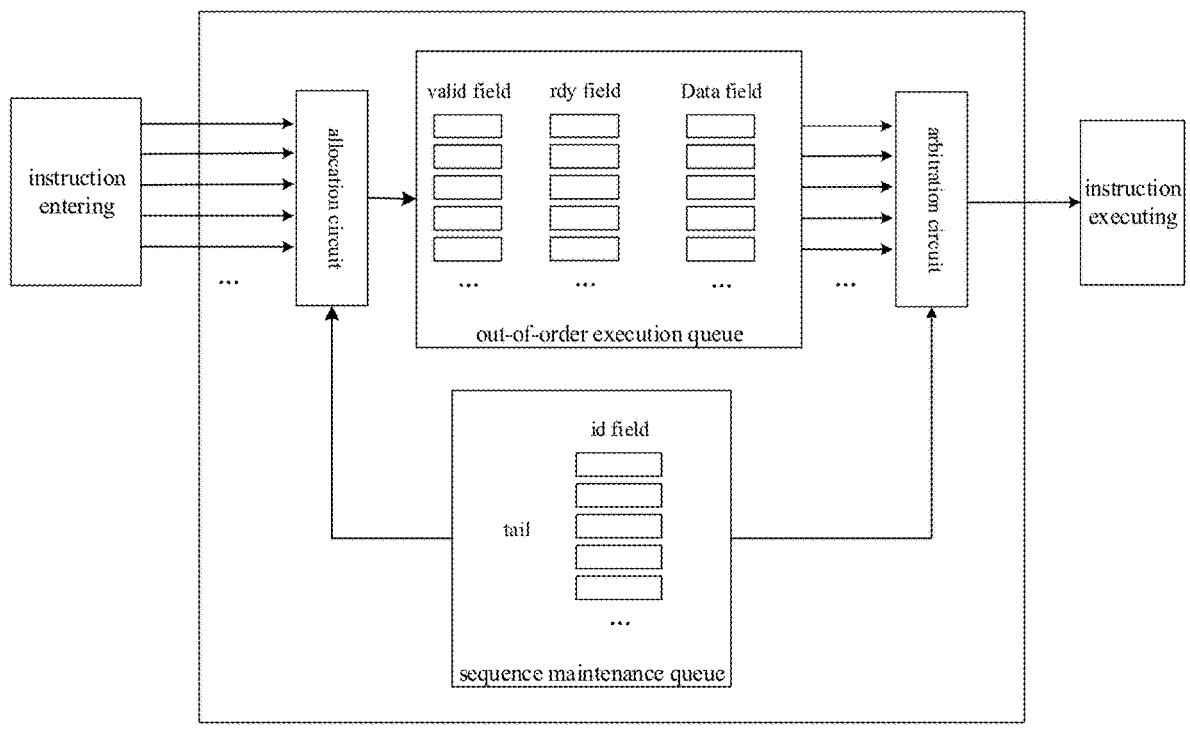
FIG. 9 is a diagram of an apparatus for scheduling an out-of-order execution queue according to an embodiment of the disclosure.

Further, the apparatus configured to execute the method for scheduling an out-of-order execution queue in an out-of-order processor is shown in FIG. 9. The distribution circuit is configured to find out the empty items in the out-of-order execution queue and enable the entered new instructions to be stored in the empty items. The arbitration circuit is also called the selection circuit. When multiple instructions in the out-of-order execution queue are ready to be executed, the oldest instruction is selected from the out-of-order execution queue for execution according to the id number information given by a sequence maintenance circuit.

When the instructions are entered, the distribution circuit selects empty items for entering. The item in the out-of-order execution queue is selected for entering according to the content in the id field pointed by the tail of the sequence maintenance queue. When the instructions are selected for execution, the arbitration circuit selects the oldest item (which has been already prepared for execution) in the out-of-sequence execution queue for execution according to the id number information given by the sequence maintenance queue by using the above-mentioned scheduling method. According to the corresponding operation, the tail and the id field content of the sequence maintenance queue are operated accordingly.

It should be noted that the out-of-order execution queue may include issue queues, access queues for all levels of caches, queues in miss-status handling registers (MSHR), and consistency request queues, etc. All the out-of-order execution queues in the processor can use the scheduling method according to the embodiments of the disclosure, which implements concise and efficient allocation of instruction entering and selection of instruction executing.

The following will further describe the method for scheduling an out-of-order execution queue in an out-of-order processor in the embodiments in which the issue queue is used as the out-of-order execution queue.

In detail, the number of items in the issue queue of the processor in the embodiment is set to 8. The function of the issue queue is to select those instructions that have been prepared for the source operands, and issue those instructions to a function unit (FU) for execution. This process is called issuing. After the instruction enters the issue queue, it will no longer flow in the processor according to the sequence specified in the program. As long as the operand of an instruction in the issue queue is ready and the issuing conditions are met, the instruction can be issued to execute in the corresponding function unit. The instruction input by the issue queue comes from the instruction dispatched by a register renaming module. The oldest instruction whose operand has been prepared is selected and issued to the function unit for execution.

An issue sequence maintenance queue with the same number of items as the issue queue is constructed, that is, 8 items, which are used to allocate empty items for the dispatched instructions to enter and select items from the issue queue that are issued to the function units for execution.

The id field of the issue sequence maintenance queue records the id number corresponding to the item of the issue queue. A first allocated item in the issue queue next time is the item of the issue queue corresponding to the id number pointed by the tail of the issue sequence maintenance queue.

The valid field of the issue queue records whether the item is valid, the rdy field records whether the operand is ready, and the data field records information such as the function unit and source operand corresponding to the instruction.

The situations are respectively processed, such as, a situation where the processor performs initialization, a situation where the issue queue only performs dispatching, a situation where the issue queue only performs issuing, a situation where the issue queue simultaneously perform dispatching and issuing, a situation where the processor performs cancellation.

1. Initialization

Figure 10:
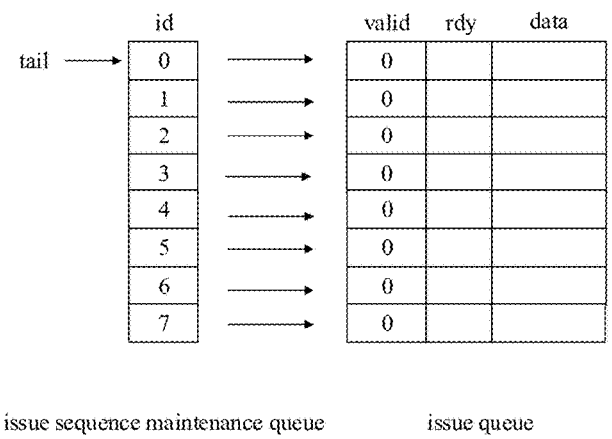
FIG. 10 is a schematic diagram of initializing an issue queue according to an embodiment of the disclosure.

During the initialization, the id numbers of items numbered 0 to 7 of the issue sequence maintenance queue are set to 0-7, the tail is set to 0, and the valid of each item in the issue queue is set to 0, as shown in FIG. 10.

2. Only Dispatching

The new instructions are dispatched to enter the item of the issue queue pointed by the id for the tail item of the issue sequence maintenance queue, where the tail in the next cycle=the tail in the current cycle +1.

Figure 11:
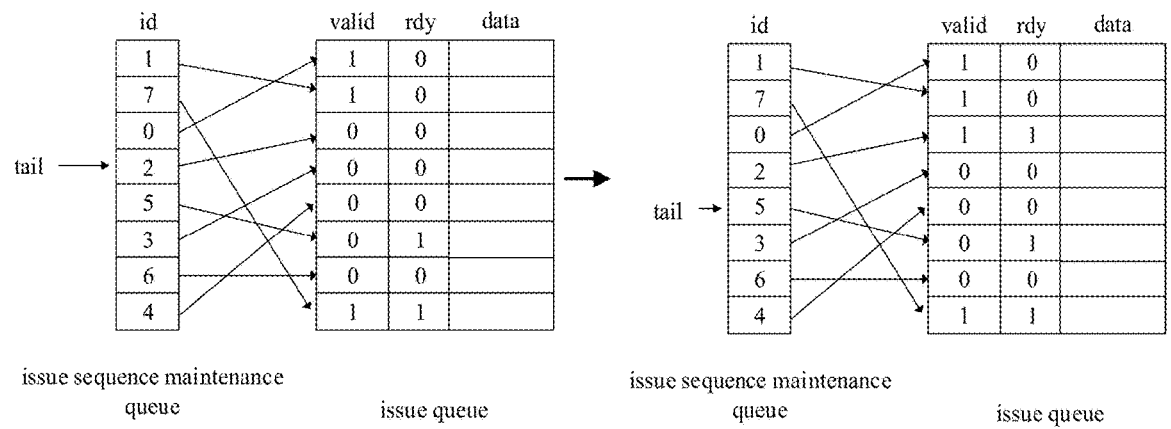
FIG. 11 is a schematic diagram illustrating a process where a dispatched instruction enters the $2^{nd}$ item of the issue queue pointed by the tail of the issue queue according to an embodiment of the disclosure.

FIG. 11 illustrates a process where the instruction is dispatched to enter the $2^{nd}$ item of the issue queue pointed by the tail of the issue queue, the valid of the $2^{nd}$ item of the issue queue is set to 1, its rdy is set to 1, which indicates that the operand for the dispatched instruction is ready, and instruction and operand information of each dispatched instruction are written into the data field, in which the tail of the sequence maintenance queue in the next cycle is moved to the next item, pointing to the item with the id number 5.

Each time the dispatching of an instruction is received and issuing is not performed in the same cycle, the tail of the issue sequence maintenance queue moves down by one item. When the issue queue is full, the tail of the issue sequence maintenance queue is equal to 8.

3. Only Issuing

The first item corresponding to the id number of the issue sequence maintenance queue that satisfies valid==1 and rdy==1 is searched in the issue queue from the top to the bottom to the tail, and is issued to the function unit, and the contents in the tail item and its previous items (together with the tail) of the issue sequence maintenance queue are moved up by one item, and the id corresponding to the issue item after issuing is stored in the tail item, where the tail in the next cycle=the tail in the current cycle −1.

Figure 12:
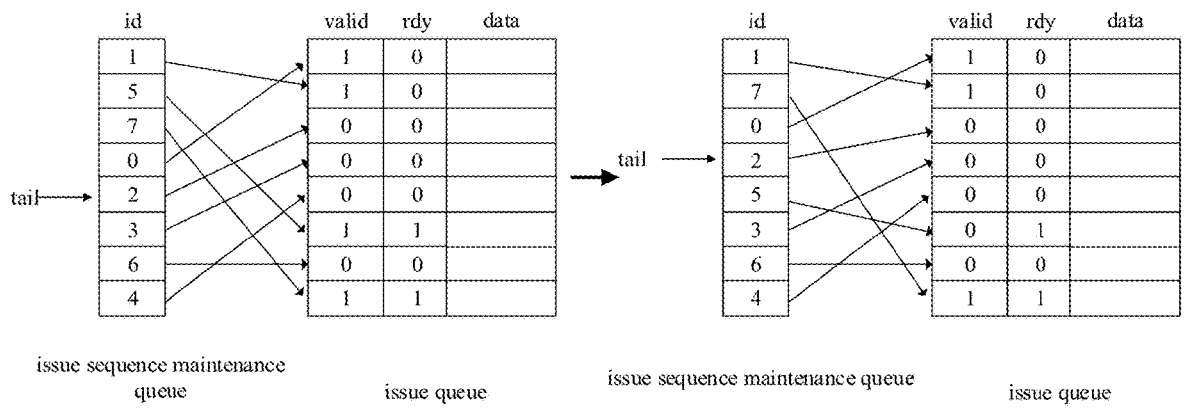
FIG. 12 is a schematic diagram illustrating a process where a first item (i.e., the item 5) in the issue queue is searched for issuing that can be issued according to an embodiment of the disclosure.

FIG. 12 illustrates a process where a first item (i.e., the item 5) in the issue queue is searched for issuing that can be issued. The valid of the issue item 5 of the issue queue is set to 0, the id numbers 7, 0, and 2 in the items of the issue sequence maintenance queue are all moved up by one item, and the id number 5 corresponding to the issue item is stored in the item pointed by the tail. The tail in the next cycle is moved up by one item, i.e., pointing to the item with the id number 2.

When the tail of the issue sequence maintenance queue points to 8, that is, the issue queue is full, the contents in items before the tail are moved up by one item after the instructions with ready operands are issued, the id number corresponding to the issue item does not enter the tail item, but enters the tail−1 item. The tail in the next cycle=7.

Figure 13:
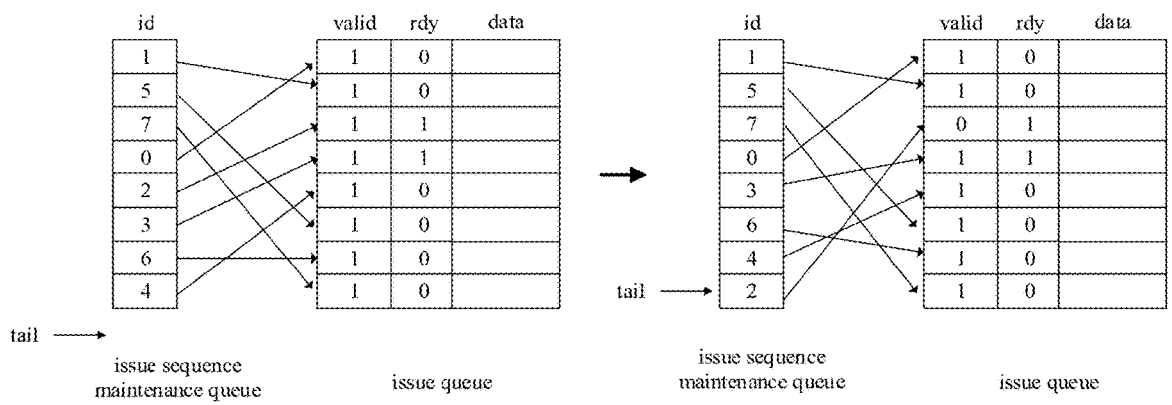
FIG. 13 is a schematic diagram illustrating an issuing process when the issue queue is full according to an embodiment of the disclosure.

In FIG. 13, tail==8 (i.e., when the issue queue is full), the item with the id number 2 of the issue sequence maintenance queue is selected from the top to the bottom, and the instruction for the $2^{nd}$ item in the issue queue is issued. The id numbers 3, 6 and 4 in the items of the issue sequence maintenance queue are moved up, the id number 2 for the issue item is written into the (tail−1) item (i.e., the $7^{th}$ item) of the issue sequence maintenance queue, where the tail in the next cycle=7.

4. Dispatching and Issuing in One Cycle

If issuing and dispatching occur at the same time, the newly dispatched instruction enters an issue queue item corresponding to the id number pointed by the tail of the issue sequence maintenance queue. The id numbers in the tail item and its previous items (together with the tail) are moved up by one item. The id for the issue item is stored in the tail item, and a value of the tail remains unchanged in the next cycle.

Figure 14:
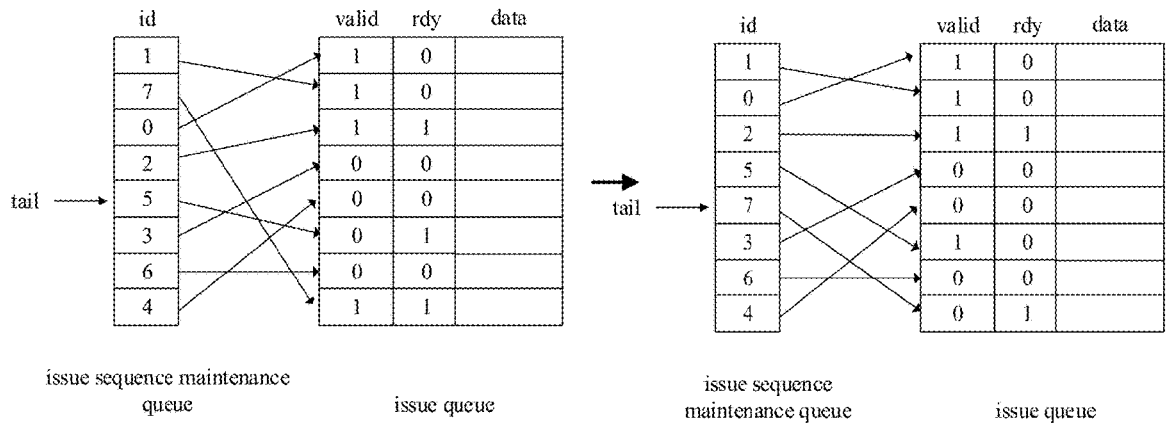
FIG. 14 is a schematic diagram illustrating simultaneous issue and dispatch according to an embodiment of the disclosure.

FIG. 14 illustrates a process where the dispatched instruction enters the $5^{th}$ item of the issue queue corresponding to the tail content, and the $7^{th}$ item of the issue queue is selected from the top to the tail for issuing. The valid of the $5^{th}$ item of the issue queue is set to 1, rdy is set to 0, which indicates that the operand of the dispatched instruction is not ready, and instruction and operand information of each dispatched instruction is written into the data field. The contents 0, 2, and 5 in the items of the issue sequence maintenance queue are moved up by one item at the same time, and the id number 7 for the issue item is stored in the item pointed by the tail item.

5. Cancellation

When the cancellation occurs, the valid of the cancelled item in the issue queue is set to 0, and no new instructions may be dispatched for entering in the cancelling cycle, and the tail value of the issue sequence maintenance queue remains unchanged.

When there are empty items in the issue queue corresponding to the id of the issue sequence maintenance queue before the tail due to cancellation, that is, the issue queue has items with valid==0, the following is performed according to the situation.

(1) If there is no instruction to be issued or dispatched in the current cycle, the empty items are processed by the issue sequence maintenance queue in a same way as a situation where there are only issue items and only one empty item may be processed in one cycle. The first empty item is found from the top to the tail item, and the contents in the tail item and its previous items (including the tail) are moved up by one item, the id corresponding to the empty item is stored in the tail item, where the tail in the next cycle=the tail in the current cycle −1.

Figure 15:
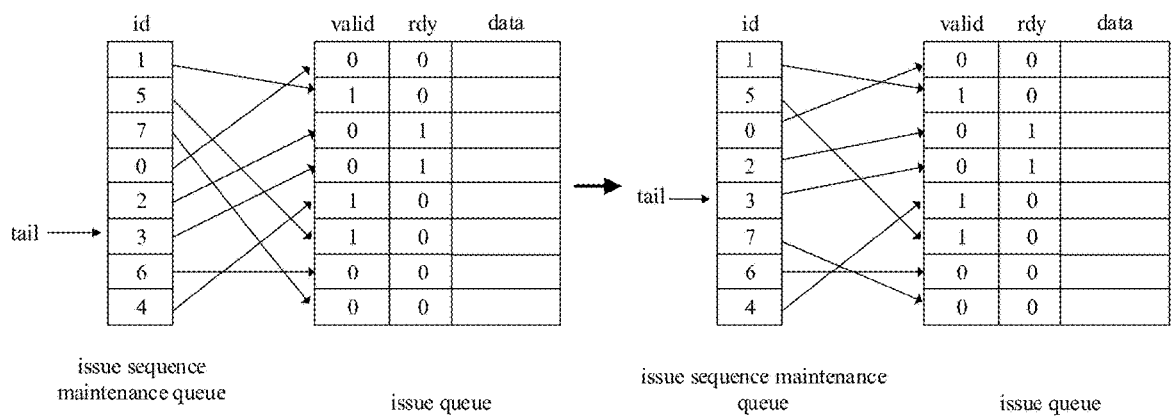
FIG. 15 is a schematic diagram illustrating there are empty items due to cancellation without dispatching according to an embodiment of the disclosure.

FIG. 15 shows that the items 7, 0, and 2 in the issue queue are cancelled due to branch cancellation. The valid bit of the corresponding item in the issue queue is 0, and there is no instruction dispatched in this cycle. The first empty item (the $7^{th}$ item) in the issue queue is found according to the id numbers of the issue sequence maintenance queue from the top to the tail item. The id numbers 0, 2, and 3 are moved up by one item respectively, and the id number 7 for the empty item is stored in the item pointed by the tail, the tail in the next cycle is moved up by one item, pointing to the item with the id number 3.

(2) If there is an instruction to be issued and to be dispatched in the current cycle, the empty item may be treated as an issue item and be processed in a same way as a situation where there are issue and dispatch items in the same cycle, and only one empty item may be processed in one cycle. The newly dispatched instruction enters the item in the issue queue corresponding to the id of the tail item. The first empty item is found from the top to the tail item. The id numbers in the tail item and its previous items (including the tail) are moved up by one item. The id for the empty item is stored in the tail item, and the value of tail remains unchanged in the next cycle.

Figure 16:
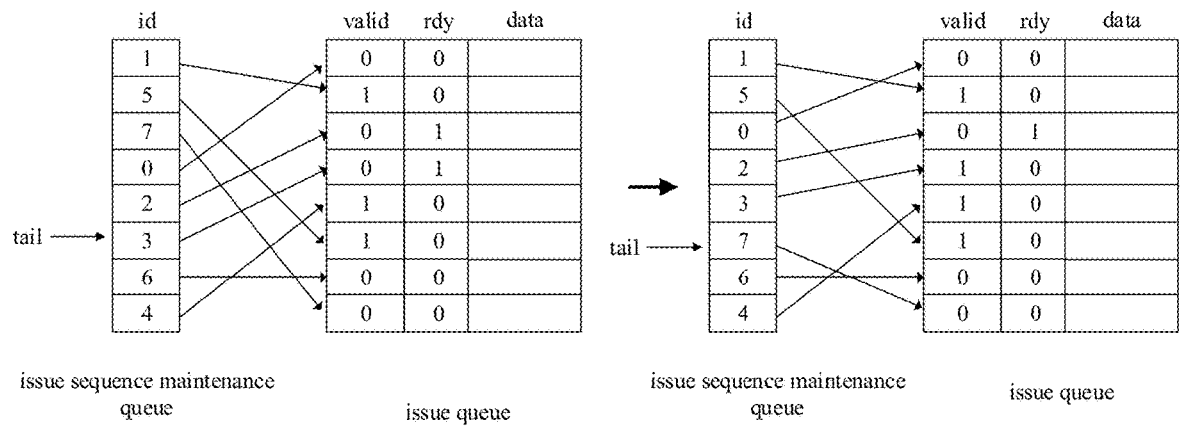
FIG. 16 is a schematic diagram illustrating there are empty items due to cancellation with dispatching according to an embodiment of the disclosure.

FIG. 16 shows that the items 7, 0, and 2 in the issue queue are cancelled due to branch cancellation. The valid bit of the corresponding item in the issue queue is 0, and there is an instruction dispatched in this cycle. The dispatched instruction enters the $3^{rd}$ item corresponding to the content pointed by the tail. The valid of the $3^{rd}$ item of the issue queue is set to 1, and the rdy is set to 0, which indicates that the operand of the dispatched instruction is not ready. The first empty item (the 7$^{th}$ item) in the issue queue is found from the top to the tail item. The id numbers 0, 2, and 3 are moved up by one item respectively, and the id number 7 for the empty item is stored in the item pointed by the tail, the tail in the next cycle remains unchanged in the next cycle, pointing to the item with the id number 7.

(3) If tail==8, the processing when there is an empty item in the issue queue due to cancellation is the same as the processing when there is only issue items in this cycle, and only one empty item is processed in one cycle. The contents in items before the tail item are moved up by one item, the id corresponding to the empty item does not enter the tail item, but enters the (tail−1) item, where the tail in the next cycle=7.

According to the method for scheduling the out-of-order execution queue in the out-of-order processor of the embodiments of the disclosure, the sequence maintenance queue is used to maintain the sequence of the out-of-order execution queue, to improve scheduling efficiency, reduce scheduling complexity, and achieve low power consumption, low latency, and save area, further to improve processor performance and reduce costs.

Next, the apparatus for scheduling the out-of-order execution queue in the out-of-order processor according to the embodiments of the disclosure will be described with reference to the accompanying drawings.

Figure 17:
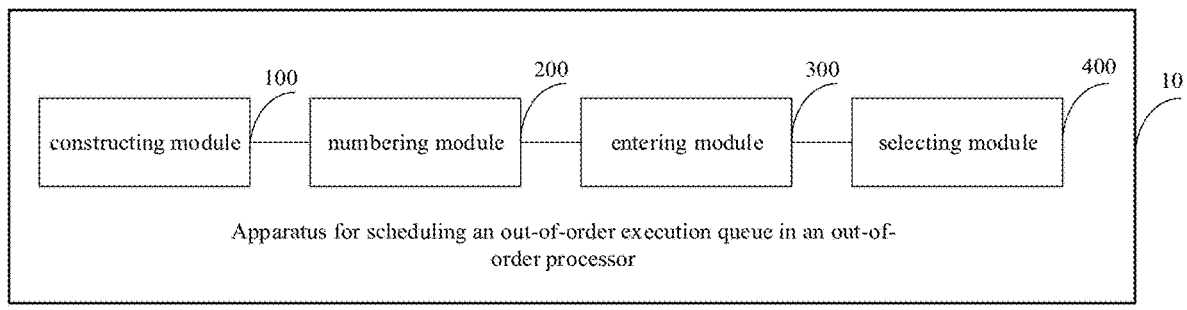
FIG. 17 is an exemplary diagram of an apparatus for scheduling an out-of-order execution queue in an out-of-order processor according to an embodiment of the disclosure.

FIG. 17 is a schematic diagram of an apparatus for scheduling an out-of-order execution queue in an out-of-order processor according to an embodiment of the disclosure.

As illustrated in FIG. 17, the apparatus 10 for scheduling the out-of-order execution queue of the out-of-order processor includes: a constructing module 100, a numbering module 200, an entering module 300 and a selecting module 400.

The constructing module 100 is configured to construct a sequence maintenance queue with a same number of items as the out-of-order execution queue, and allocate an empty item for instructions and data entering the out-of-order execution queue, wherein the sequence maintenance queue comprises at least one identity (id) field. The numbering module 200 is configured to number each item of the out-of-order execution queue sequentially, and record an id number of each item of the out-of-order execution queue in the id field of the sequence maintenance queue. The entering module 300 is configured to enable the instructions to enter an item of the out-of-order execution queue corresponding to an id number pointed by a tail of the sequence maintenance queue. The selecting module 400 is configured to select instructions in ready items for execution from the out-of-order execution queue according to id number information indicated by the sequence maintenance queue.

It should be noted that the foregoing explanation of the method for scheduling an out-of-order execution queue in an out-of-order processor is also applicable to the apparatus for scheduling an out-of-order execution queue in an out-of-order processor in this embodiment, and which will not be repeated here.

With the apparatus for scheduling an out-of-order execution queue in an out-of-order processor according to the embodiments of the disclosure, the sequence maintenance queue is used to maintain the sequence of the out-of-order execution queue, in order to improve scheduling efficiency and reduce scheduling complexity, and to achieve low power consumption, low delay, and save area, further to improve processor performance, increase main frequency, reduce power consumption and costs.

The embodiments of the disclosure further provide an electronic device, the electronic device includes at least one processor and a memory communicatively connected with the at least one processor. The memory stores instructions that can be executed by the at least one processor. When the instructions are executed, the method for scheduling an out-of-order execution queue in an out-of-order processor according to the above embodiments is implemented.

The embodiments of the disclosure also provide a computer-readable storage medium on which a computer program is stored, when the program is executed by the processor, the method for scheduling an out-of-order execution queue in an out-of-order processor as described above is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or N embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may comprise one or more this feature. In the description of the disclosure, "N" means at least two, for example, two or three, unless specified otherwise.

Any process or method described in a flowchart or described herein in other ways may be understood to include one or N modules, segments or portions of codes of executable instructions for achieving specific logical functions or steps in the process, and the scope of a preferred embodiment of the disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or N wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, N steps or methods may be realized by the software or firmware stored in the memory and executed by the appropriate instruction execution system. For example, if it is realized by the hardware, likewise in another embodiment, the steps or methods may be realized by one or a combination of the following techniques known in the art: discrete logic circuits having logic gate circuits for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual function units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the disclosure, and changes, alternatives, and modifications can be made in the embodiments without departing from scope of the disclosure.

What is claimed is:

1. A method for scheduling an out-of-order execution queue in an out-of-order processor, comprising:
    constructing a sequence maintenance queue with a same number of items as the out-of-order execution queue, and allocating an empty item for instructions and data entering the out-of-order execution queue, wherein the sequence maintenance queue comprises at least one identity (id) field;
    numbering each item of the out-of-order execution queue sequentially, and recording an id number of each item of the out-of-order execution queue in the id field of the sequence maintenance queue;
    enabling the instructions to enter an item of the out-of-order execution queue corresponding to an id number pointed by a tail of the sequence maintenance queue; and
    selecting instructions in ready items for execution from the out-of-order execution queue according to id number information indicated by the sequence maintenance queue;
    wherein each item in the out-of-order execution queue comprises a valid field and a ready (rdy) field, in which the valid field is configured to record whether a corresponding item of the out-of-order execution queue is valid, the rdy field is configured to record whether the instructions and data in the corresponding item of the out-of-order execution queue are ready, and the sequence maintenance queue comprises a tail item, in which the tail item is an item pointed by the tail of the sequence maintenance queue;
    wherein in response to there being only execution of instructions selected from the out-of-order execution queue of the processor and no instruction entering into the out-of-order execution queue, the method further comprises:
        in an order from the top to the tail item in the sequence maintenance queue, searching a first item whose valid field is 1 and rdy field is 1 from the items in the out-of-order execution queue and executing an instruction for the first item,
        setting the first item to be an empty item,
        moving the id number in the tail item and the id number in items between the tail item and the empty item up by one item, and
        saving an id number corresponding to the empty item in the id field of the tail item, where the tail in a next cycle equals the tail in a current cycle minus one, the valid field being 1 indicates that the corresponding item is valid, and the rdy field being 1 indicates that the instructions and data of the corresponding item are ready.

2. The method according to claim 1, wherein a first empty item that is allocated for the instructions and data entering the out-of-order execution queue is the item of the out-of-order execution queue corresponding to the id number pointed by the tail of the sequence maintenance queue.

3. The method according to claim 1, wherein in response to the processor performing initialization, the method further comprises:
    numbering the id field of each item in the sequence maintenance queue sequentially from top to bottom, and setting the tail to 0, the valid field of each item in the out-of-order execution queue to 0, in which the valid field being 0 indicates that the corresponding item is invalid.

4. The method according to claim 1, wherein in response to there being only instruction entering into the out-of-order execution queue of the processor and no instruction execution in the out-of-order execution queue, the method further comprises:
    enabling the instructions to enter the item of the out-of-order execution queue corresponding to the id number pointed by the tail, and moving the tail down by one item, where the tail in a next cycle equals the tail in a current cycle plus one.

5. The method according to claim 1, wherein in response to the out-of-order execution queue being full, the method further comprises:
    after the ready instructions are executed, moving the id numbers in the items between the tail item and the empty item up by one item,
    enabling the empty item whose instructions are executed in the out-of-order execution queue into a (tail−1) item, in which the (tail−1) item is a last item of the sequence maintenance queue in the current cycle, and enabling the tail in the next cycle to point to the last item of the sequence maintenance queue in the current cycle, where the tail in the next cycle equals a number of the last item of the sequence maintenance queue in the current cycle.

6. The method according to claim 1, wherein in response to there being both instruction entering into the out-of-order execution queue of the processor and execution of instructions selected from the out-of-order execution queue at the same time, the method further comprises:

enabling new instructions to enter into the item of the out-of-sequence execution queue corresponding to the id number pointed by the tail, moving the id number in the tail item and the id number in each item between the tail item and an issuing item up by one item, wherein the issuing item is a first item whose valid field is 1 and rdy field is 1 in an order from the top to the tail item, and storing an id number for the issuing item in the tail item, wherein the tail in a next cycle remains unchanged.

7. The method according to claim 1, wherein in response to the processor being in a cancellation situation, the method further comprises:

setting a valid field of a cancelled item in the out-of-order execution queue to 0, wherein the cancelled item whose valid field is set to 0 is an empty item, and no new instructions are entered into the cancelled item, and the tail remains unchanged.

8. The method according to claim 7, wherein in response to there being neither instruction execution nor instruction entering in a current cycle, the empty items are processed according to a first preset situation, where only one empty item is processed in one cycle, and a first empty item is searched sequentially from the top to the tail item, the id number in the tail item and the id numbers in items between the tail item and the first empty item are moved up by one item, the id number corresponding to the first empty item is stored in the tail item, where the tail in a next cycle equals the tail in the current cycle minus one.

9. The method according to claim 7, wherein in response to there being no instruction execution and there being instruction entering in a current cycle, the empty items are processed according to a second preset situation, where one empty item is processed in one cycle according to a second preset situation, new instructions are entered into the item of the out-of-order execution queue corresponding to the id number for the tail item, and a first empty item is searched from the top to the tail item, the id number in the tail item and the id number in items between the tail item and the first empty item are moved up by one item, the id number for the first empty item is stored in the tail item, and the tail in a next cycle remains unchanged.

10. The method according to claim 7, wherein in response to the out-of-order execution queue being full, the empty items are processed according to a third preset situation, where one empty item is processed in a current cycle, the id number in each item between the tail item and the empty item is moved up by one item, and the id number corresponding to the empty item are entered into the (tail−1) item in which the (tail−1) item is a last item of the sequence maintenance queue in the current cycle, the tail in a next cycle points to the last item of the sequence maintenance queue in the current cycle, where the tail in the next cycle equals a number of the last item of the sequence maintenance queue in the current cycle.

11. An apparatus for scheduling an out-of-order execution queue in an out-of-order processor, comprising:

the processor; and a memory configured to store computer instructions executable by the processor;

wherein the processor is configured to:

construct a sequence maintenance queue with a same number of items as the out-of-order execution queue, and allocate empty items for instructions and data entering the out-of-order execution queue, wherein the sequence maintenance queue comprises at least one identity (id) field;

number each item of the out-of-order execution queue sequentially, and record an id number of each item of the out-of-order execution queue in the id field of the sequence maintenance queue;

enable the instructions to enter an item of the out-of-order execution queue corresponding to an id number pointed by a tail of the sequence maintenance queue; and select instructions in ready items for execution from the out-of-order execution queue according to id number information indicated by the sequence maintenance queue;

wherein each item in the out-of-order execution queue comprises a valid field and a ready (rdy) field, in which the valid field is configured to record whether a corresponding item of the out-of-order execution queue is valid, the rdy field is configured to record whether the instructions and data in the corresponding item of the out-of-order execution queue are ready, and the sequence maintenance queue comprises a tail item, in which the tail item is an item pointed by the tail of the sequence maintenance queue;

wherein in response to there being only execution of instructions selected from the out-of-order execution queue of the processor and no instruction entering into the out-of-order execution queue, the processor is further configured to:

in an order from the top to the tail item in the sequence maintenance queue, search a first item whose valid field is 1 and rdy field is 1 from the items in the out-of-order execution queue and executing an instruction for the first item, set the first item to be an empty item, move the id number in the tail item and the id number in items between the tail item and the empty item up by one item, and save an id number corresponding to the empty item in the id field of the tail item, where the tail in a next cycle equals the tail in a current cycle minus one, the valid field being 1 indicates that the corresponding item is valid, and the rdy field being 1 indicates that the instructions and data of the corresponding item are ready.

12. The apparatus according to claim 11, wherein in response to the processor performing initialization, the processor is further configured to:

number the id field of each item in the sequence maintenance queue sequentially from top to bottom, and set the tail item to 0, the valid field of each item in the out-of-order execution queue to 0, in which the valid field being 0 indicates that the corresponding item is invalid.

13. The apparatus according to claim 11, wherein in response to there being only instruction entering into the out-of-order execution queue and no execution of instructions selected from the out-of-order execution queue, the processor is further configured to:
enable the instructions to enter the item of the out-of-order execution queue corresponding to the id number pointed by the tail, and moving the tail down by one item, where the tail in a next cycle equals the tail in a current cycle plus one.

14. The apparatus according to claim 11, wherein in response to the out-of-order execution queue being full, the processor is further configured to:
after the ready instructions are executed, move the id numbers in the items between the tail item and the empty item up by one item, enable the empty item whose instructions are executed in the out-of-order execution queue into a (tail−1) item, in which the (tail−1) item is a last item of the sequence maintenance queue in the current cycle, and enable the tail in the next cycle to point to the last item of the sequence maintenance queue in the current cycle, where the tail in the next cycle equals a number of the last item of the sequence maintenance queue in the current cycle.

15. The apparatus according to claim 11, wherein in response to there being both instruction entering into the out-of-order execution queue and execution of instructions selected from the out-of-order execution queue at the same time, the processor is further configured to:
enable new instructions to enter into the item of the out-of-sequence execution queue corresponding to the id number pointed by the tail, moving the id number in the tail item and the id number in each item between the tail item and an issuing item up by one item, wherein the issuing item is a first item whose valid field is 1 and rdy field is 1 in an order from the top to the tail item, and storing an id number for the issuing item in the tail item, wherein the tail in a next cycle remains unchanged.

16. A non-transitory computer-readable storage medium having a computer program stored thereon, wherein when the computer program is executed by a processor, a method for scheduling an out-of-order execution queue in an out-of-order processor is implemented, the method comprising:
constructing a sequence maintenance queue with a same number of items as the out-of-order execution queue, and allocating an empty item for instructions and data entering the out-of-order execution queue, wherein the sequence maintenance queue comprises at least one identity (id) field;

numbering each item of the out-of-order execution queue sequentially, and recording an id number of each item of the out-of-order execution queue in the id field of the sequence maintenance queue;

enabling the instructions to enter an item of the out-of-order execution queue corresponding to an id number pointed by a tail of the sequence maintenance queue; and selecting instructions in ready items for execution from the out-of-order execution queue according to id number information indicated by the sequence maintenance queue;

wherein each item in the out-of-order execution queue comprises a valid field and a ready (rdy) field, in which the valid field is configured to record whether a corresponding item of the out-of-order execution queue is valid, the rdy field is configured to record whether the instructions and data in the corresponding item of the out-of-order execution queue are ready, and the sequence maintenance queue comprises a tail item, in which the tail item is an item pointed by the tail of the sequence maintenance queue;

wherein in response to there being only execution of instructions selected from the out-of-order execution queue of the processor and no instruction entering into the out-of-order execution queue, the method further comprises:
in an order from the top to the tail item in the sequence maintenance queue, searching a first item whose valid field is 1 and rdy field is 1 from the items in the out-of-order execution queue and executing an instruction for the first item,
setting the first item to be an empty item,
moving the id number in the tail item and the id number in items between the tail item and the empty item up by one item, and
saving an id number corresponding to the empty item in the id field of the tail item, where the tail in a next cycle equals the tail in a current cycle minus one, the valid field being 1 indicates that the corresponding item is valid, and the rdy field being 1 indicates that the instructions and data of the corresponding item are ready.

* * * * *